Feb. 11, 1969   R. L. VICK   3,426,784
FLOW EQUALIZER AND PROPORTIONER VALVE
Filed Oct. 22, 1965
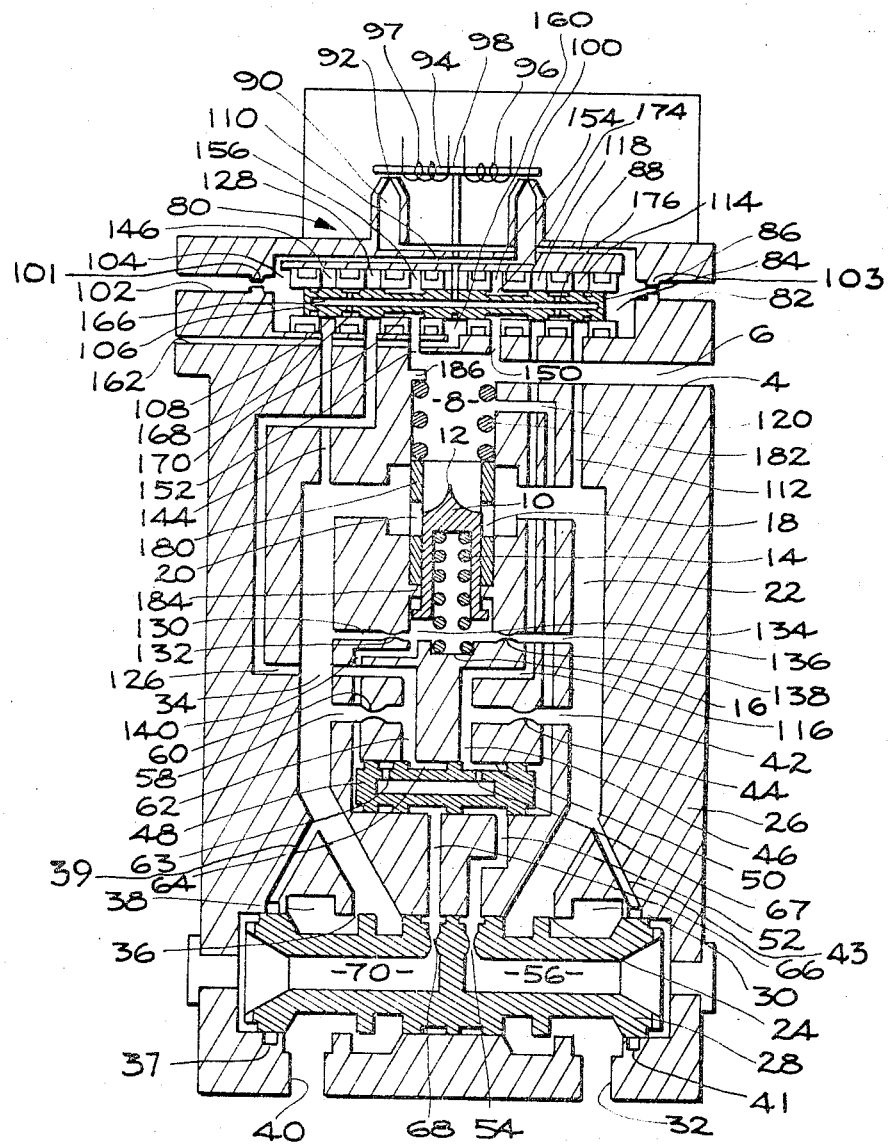
INVENTOR.
RALPH L. VICK
BY
Robert C. Smith
ATTORNEY

United States Patent Office 3,426,784
Patented Feb. 11, 1969

3,426,784
FLOW EQUALIZER AND PROPORTIONER VALVE
Ralph L. Vick, Granada Hills, Calif., assignor to The Bendix Corporation, a corporation of Delaware
Filed Oct. 22, 1965, Ser. No. 500,713
U.S. Cl. 137—99
Int. Cl. G05d 11/035, 16/20; F16k 11/02
6 Claims

ABSTRACT OF THE DISCLOSURE

A flow equalizer valve structure including a pair of equal area orifices for dividing inlet flow into two paths, and a multiland spool valve connected between the paths and across the outlets to each path to control its effective orifice area. A second spool is connected between each of the paths and conduits connecting each end of the first spool such that it senses pressure differentials between said paths and moves to adjust compensating fluid pressures acting on the ends of the first spool to cause it to seek a position adjusting flow across the outlet orifices until the pressures are equal. A servo valve connected in the inlet also has fluid connections to the second spool to cause the second spool to be positioned to provide a desired proportional flow across the outlet orifices. The valve is also reversible to combine two flows into a single flow in equal quantities or a desired proportion.

---

This invention relates to valves. More particularly, this invention relates to a flow-equalizing valve in which changes in downstream pressure are compensated for so as to have equal flow in two directions from a common source. In addition, a proportioner is provided so that flows can be proportioned where desired as between two outlets from a common inlet source. The valve is also adaptable for reverse flow so as to receive two flows in a reverse direction and to combine them as desired into one flow so that the flows can be controlled.

There are many examples in the prior art wherein it is necessary to provide a flow-equalizing valve so that the inlet from a common source can be divided equally or proportionally, as desired. For example, where it is desired to have hydraulic motors which in turn drive separate hoist mechanisms, it is necessary that the hoists raise and lower evenly. In such a case it is necessary that the hydraulic flow to each of the hydraulic motors be evenly divided. In other examples, it is necessary that a proportion of the flow be diverted to one type of motor and the remainder diverted to another motor wherein it is desired that a certain ratio of flow exist as between one motor and the other. In such a case, it is necessary that the flow be proportioned regardless of downstream load. In addition, the motors can act as brakes on a hoist mechanism such that the downstream pressure would become greater than the upstream pressure. Since it is desirable to have equal braking by both motors, equal flow in the reverse direction is necessary. It is sometimes desirable, also, to have proportional flow which can be controlled by a valve mechanism during this braking action.

In aircraft, it is often desirable to have a plurality of items actuated at the same rate of speed. It is also desirable to actuate these devices evenly which may become aerodynamically unbalanced so as to produce unequal speeds of movement. As an example, there may be an uneven retraction of landing gear with a closing of doors, or the closing of bomb bay doors, which might seriously affect the airplane when there are unequal loads upon them, such as in a cross wind. Another example resides in the actuation of flaps on the wings of aircraft which can become unbalanced during landings or take-off. When the power fluid is relatively imcompressible, such as hydraulic fluid, equalizer valves are necessary to equalize the rate of speed of two remote motors, regardless of the relative loads imposed upon them.

Briefly, this invention comprises a reversible equalizer valve which will not only divide a fluid flow equally, but has the capacity to combine two flows into a single flow in equal quantities. These functions are independent of the load against which the flow acts or which acts on the flow when the flow is in the reverse direction. A proportioner is provided which, in addition to the above function, acts to proportion the flow in any desired quantity in both directions of flow. This valve operates on a principle that an equal change in pressure across equal area flow orifices results in equal flow through both orifices. When this condition exists, the ultimate downstream pressure or load is immaterial.

It is, therefore, an object of this invention to provide an improved equalizer valve.

It is another object of this invention to provide an improved equalizer valve which is reversible in operation.

It is another object of this invention to provide an improved method for equalizing flows from a common source and to divide this flow into either equal or predetermined proportional flows.

It is another object of this invention to provide an equalizer valve which is reversible in operation and which is proportional in either direction.

Other objects and advantages of this invention will become apparent as this description proceeds, taken in conjunction with the drawing, in which:

FIGURE 1 is a schematic view partially in cross-section of an equalizer valve constructed according to this invention.

Structure

Referring to FIGURE 1, the equalizer valve constructed according to this invention is shown. The valve has an inlet 4 and an inlet line or conduit 6 which leads into a cavity 8. Within the cavity is a normally closed piston 10 which, as shown, has a peak or divider 12 which serves to divide the flow in cavity 8. Piston 10 is normally held closed by spring 14 which abuts on a shoulder 16. When pressure in cavity 8 builds up to a predetermined amount, for example 75 p.s.i., piston 10 will be forced downwardly against the bias of spring 14 so as to open orifices 18 and 20. Flow through orifice 18 will enter conduit 22 and pass through orifice 24 formed between valve housing 26 and movable spool 28. Flow will enter annular manifold 30 and exit through outlet 32. In a similar manner, flow through orifice 20 will pass through line 34, orifice 36 formed between valve housing 26 and spool 28, and will enter annular manifold 38 and then exit through outlet 40. At all times, orifices 20 and 18 have equal cross-sectional areas which are dependent upon the position of piston 10.

Branching from conduit 22 is another conduit 42 which has contained therein an orifice 44. This conduit 42 leads into another conduit 46 which, when spool 48 is at the left position, will pass through manifold 50 and into line 52. Flow will then pass through damping orifice 54 and into cavity 56 of spool 28. Pressure in cavity 56 will tend to move spool 28 to the left. In a similar manner, flow or fluid in line 34 will pass through conduit 58 and orifice 60 in a manner similar to that described with reference to conduit 22. This flow will pass through line 62, manifold 64, into line 66. The pressure is exerted through damping orifice 68 into cavity 70 which will tend to move spool 28 to the right in a manner similar to pressure exerted in cavity 56 tending to move spool 28 to the left.

As servo valve is indicated generally at 80 and is constructed in a manner similar to that described in U.S.

Patent No. 2,823,689. Pressure is exerted through line 82 and enters cavity 84 and is exerted on end 86 of spool member 108, tending to move it to the left as viewed in FIGURE 1. This fluid pressure is exerted also through line 88 and into cavity 90 and is free to pass through orifice 92 when member 94 is either in the neutral position or is forced downwardly to the right through the action of coils 96 and 97. This member 94 is pivoted about point 98 and is free to close selectively either orifice 92 or orifice 100. In the neutral position, flow can occur through both orifice 92 and orifice 100. In a similar manner, pressure is exerted at inlet 102 and through cavity 104 on end 106 of spool member 108. In a manner similar to line 88, fluid pressure is exerted through line 110 and therefore exerts pressure through orifice 100.

Conduit 22 has leading therefrom a branch conduit 112 to exert a pressure in manifold 114. Likewise, conduit 42 has leading therefrom a conduit 116 leading to manifold 118 of servo valve 80. Leading from cavity 8 is another conduit 120 which tends to exert a pressure against spool member 48 so as to move it toward the left.

Likewise, leading from conduit 58 is another conduit 126 which leads into manifold 128. From conduit 34 there is another conduit 130 which through orifice 132 communicates with manifold 134. Leading from manifold 134 is another line 140 which communicates with the left-hand side of spool 48. From conduit 34 is another conduit 144 which communicates with manifold 146. From the top of cavity 8 are similar conduits 150 and 152 which lead into manifolds 154 and 156, respectively. A return manifold 160 leads into return line 162 of servo valve 80.

Spool 108 has contained therein an internal cavity 166 which, through passage 168, is free to communicate with manifold 128 when the spool is moved to the right. Likewise, a manifold 170 is free to communicate with manifold 156 and manifold 128 when the spool is moved to the left. In a like manner, manifold 174 is free to provide passage of fluid from between manifolds 118 and 154 when the spool is moved to the right. Passage 176 similarly provides flow from manifold 114 to passage 166 when the spool is moved to the right.

The hollow cylinder 180 is shown as surrounding piston 10. Cylinder 180 is normally biased by spring 182 to a downward position so as to rest on or abut against shoulder 184. Likewise, spring 182 abuts shoulder 186 at the top thereof which is formed as a part of valve housing 26. During reverse operation, when downstream pressure in conduit or cavity 34 exceeds the upstream pressure in cavity 8 by a predetermined amount (orifices 18 and 20 are normally closed since piston 10 is in its upward position), this pressure in manifold 134 communicated past shoulder 184 contacts the annular surface on the bottom of piston 180 and forces piston 180 upwardly against the bias of spring 182 so as to open orifices 18 and 20.

*Operation—Equal flow with equal downstream load (flow dividing)*

Assuming a condition of an inlet pressure through conduit 4 of approximately 3000 p.s.i. and equal downstream loads at outlets 32 and 40 of 2900 p.s.i., the operation of the device is as follows.

Pressure exerted through conduit 6 of 3000 p.s.i. will pressurize cavity 8 to this pressure. This pressure will open piston 10 against the bias of spring 14 to allow flow of fluid through orifices 18 and 20. At the same time, this pressure will be exerted through conduit 120 against the right side of spool 48, forcing it to the left. It is noted that this pressure likewise is 3000 p.s.i. since, due to the absence of flow, it would have the same pressure as in cavity 8. A pressure drop will occur across both orifices 18 and 20 so that pressure in lines 22 and 34 would be approximately 2925 p.s.i. This pressure will be exerted through manifold or cavity 134 and is, in turn, exerted against the left-hand side of spool 48. Thus, since there is a pressure imbalance as between the right and left sides of spool 48 with the pressure on the right side greater than on the left side, spool 48 will be moved to the extreme left position, as shown in the drawing. Pressure in cavity 22 will be exerted through conduit 42 and orifice 44 into manifold 50, line 52, and through orifice 54 into cavity 56. Since there is no flow, there is no pressure drop, and thus pressure in cavity 56 is likewise 2925 p.s.i. This will tend to move spool 28 to the left. However, flow or fluid pressure in cavity 34 will pass through conduit 58, orifice 60, line 62, manifold 64, line 66, orifice 68, and eventually into cavity 70, and will likewise have a pressure of 2925 p.s.i. due to the lack of fluid flow once cavity 70 is pressurized. Since the pressure in both cavities 56 and 70 are equal, the spool 28 will then have a neutral position. Fluid will flow through both cavities 22 and 34 through orifices 24 and 36, respectively. These orifices, when spool 28 is in the neutral position, are equal, and thus the fluid flow therethrough is likewise equal. Assuming a condition of constant outlet pressure at outlets 32 and 40 of 2900 p.s.i. due to the pressure drop across the orifices 24 and 36, the flow will be equal. This flow is equal (an assumed condition) when the pressures in cavities 22 and 34 are equal since the areas of orifices 18 and 20 are likewise equal. Inlet flow through conduit 4 will be divided equally between both cavities 22 and 34, resulting in a condition of equal flow. It is noted that since pressure in cavity 8, assumed to be 3000 p.s.i., is greater than the presure in manifold 134, which is 2925 p.s.i., the pressure on the top of piston 10 is great enough to open the piston against the bias of springs 14 due to the greater pressure on the top thereof than on the bottom. This pressure differential is sufficient to overcome the bias of spring 14.

*Operation—Equal flow with unequal downstream loads (flow dividing)*

Assuming a condition wherein the downstream loads are unequal and wherein it is desired to have equal flows through both of the outlets 32 and 40 with these unequal loads, the operation is as follows.

For example, outlet 32 may have a back pressure of 2910 p.s.i. with outlet 40 having a back pressure of 510 p.s.i. With this condition, a higher flow will result through orifice 36 than through orifice 24. This is due to the large pressure drop as between cavity 34 and outlet 40. When this condition occurs, the pressure will be reduced in cavity 34, and since cavity 34 communicates with cavity 70 in spool 28, the pressure in cavity 70 will likewise be reduced. When this condition occurs, spool 28 will be moved to the left due to the higher pressure in cavity 56. The pressure differential across orifice 36 will thus be increased, building up the pressure in cavity 34. Spool 28 will thus seek an equilibrium position which is determined by the pressures in cavities 56 and 70 and their communication with cavities 22 and 34, respectively. Accordingly, as the area of orifices 18 and 20 are equal and the position of spool 28 will seek an equilibrium position so as to have balancing pressures in cavities 22 and 34, the flow through these cavities 22 and 34 will be equal due to the equal pressures and equal areas of orifices 18 and 20. Thus it can be seen that the device is self-compensating so as to provide for equal flows from a common inlet source, even though the back pressure at the outlets 32 and 40 are unequal. Other conditions can, of course, exist, the figures of 2910 and 510 p.s.i. pressures being given only as an example. The communicating chambers surrounding orifices 36 and 24 are designed so as to minimize or eliminate flow momentum forces which result in error. Annular chamber 37, which connects to chamber 34 through passage 39, and chamber 41, which connects to chamber 22 through passage 43, are used to minimize lap spool leakage flow through damping orifices 68 and 54. This allows these orifices to be of small area without affecting flow control accuracy.

Operation—Proportional flow with equal downstream load

Assuming a condition of equal downstream load in both outlets 32 and 40, any desired proportional flow may be directed through either one of these outlets, depending on the desired conditions. For example, if it is desired to have a greater flow through outlet 32 than through outlet 40 with equal downstream loads, servo valve 80 is actuated. To accomplish this, coils 96 and 97 may be actuated so as to pivot plate 94 about pivot point 98 so as to force the right side of plate 94 toward orifice 100 and the left side of plate 94 away from orifice 92. This has the result of building up the pressure in cavity 104 due to the restriction of flow through orifice 100 (which is in series with orifice 101) while at the same time reducing the pressure in cavity 84 due to increased flow through orifice 92 (which is in series with orifice 103). The position of plate 94 can be determined at will. When this occurs, manifold 174 will connect both manifolds 154 and 118 together to allow flow through conduit 116. This has the net result of increasing the pressure in cavity 56 of spool 28 so as to tend to drive it toward the left, thus opening the flow area 24 as compared with flow area 36. Accordingly, the flow through outlet 32 will increase relative to the outlet flow through outlet 40, which will be decreased. Thus, flow from high pressure cavity 8 will be metered through conduit 150, manifold 154, and through manifold 174 into manifold 118 and thus through conduit 116 into cavity 56. At the same time, flow will pass through orifice 44 into cavity or conduit 22.

Orifices 132 and 138 are provided so as to sense pressure pickup in a variable orifice inlet assembly from either cavity 22 or 34. The position of plate 94 is controlled by differential current to torque motor coils 96 and 97. Spool 106 is forced to a position which places a counterbalancing torque to pivot 98. Thus a given torque motor input provides a given spool position. In like manner, plate 94 can be pivoted about point 98 in the opposite direction so as to close off or build up the pressure within cavity 84 relative to the pressure in cavity 104 so as to draw or force spool 106 to the left so as to increase the flow through outlet 40 relative to outlet 32 in much the same manner as previously described.

Operation—Combining flow with equal downstream load

Assuming reverse operation with a condition of greater downstream pressure in outlets 32 and 40 than in inlet 4, inlet 4 will become an outlet with flow entering ports 32 and 40. When this condition exists, pressure will build up in both cavities 22 and 34 which, when sufficiently high, will be communicated from manifold 34 past shoulder 184 to open sleeve or piston 180 against the spring load caused by springs 182. This will uncover equal orifices 18 and 20 leading from the chambers 22 and 34, respectively. This differential pressure will enter or be exerted through conduit 130 at orifice 132 into manifold 134. This pressure will be exerted through conduit 140 to be exerted on the left side of spool 48. This results in spool 48 being driven to the right since pressure in conduit 140, which is greater than that in cavity 8, will be greater than on the right side of spool 48 since the pressure on the right side of spool 48 is equal to that in cavity 8. This results in the condition that cavity 34 will be in communication with cavity 56 of spool 28 and with cavity 22 in communication with cavity 70 of spool 28. This is accomplished since conduit 62 will be aligned with orifice 63 which communicates with chamber 65 and which in turn is communicated with orifice 67. Thus, pressure in cavity 22 will be exerted through orifice 44 and line 46 through manifold 64 and thus through line 66 and orifice 68 into cavity 70. In like manner, pressure in cavity 34 will be exerted through orifice 60 of line 58 into line 62 and through orifice 63, manifold 65, and orifice 67 into manifold 50, line 52, and into cavity 56. Thus, the position of spool 28 will be determined by the pressures in cavities 56 and 70 so as to combine the flows with equal loads into the inlet 4, which, in this case, becomes the outlet. Equal flows, since there are equal pressures in cavities 22 and 34, will occur through equal area orifices 18 and 20.

Operation—Combining flow with variable downstream loads

In the condition of variable downstream loads, assuming a pressure of 1000 p.s.i. at port 40 and a pressure of 200 p.s.i. at port 32, the pressure in chamber 34 will tend to rise relative to the pressure in chamber 22. Thus, a greater pressure drop across orifice 20 will occur than across orifice 18, resulting in greater flow due to the equal areas of orifices 18 and 20. However, pressure will be exerted through conduit 58 and orifice 60 into line 62. Since the pressure in cavity 34 is greater than the pressure in cavity 8, spool 48 will be driven to the right, as previously described, when the downstream pressure is greater than upstream pressure. Accordingly, pressure will be exerted through orifice 63, manifold 65, and orifice 67 into line 52 and thus into cavity 56 of spool 28. This will tend to move spool 28 to the left until the area of orifice 36 is diminished and a balanced condition of pressures in cavities 34 and 22 exist, thus resulting in equal flows across orifices 18 and 20 since, as previously explained, equal pressures and equal orifice areas result in equal flows. With this condition, pressures in cavities 70 and 56 would be approximately 175 p.s.i., which is equal to the pressure in cavities 22 and 34. The pressure drop across orifices 18 and 20 would typically be 75 p.s.i., resulting in an outlet pressure at inlet 4 of 100 p.s.i.

Operation—Unequal combining downstream pressures proportioning flow

Assuming a condition of a load of 3000 p.s.i. at port 32 and a load of 600 p.s.i. at port 40, it can be seen that, as previously described, the downstream pressures at ports 32 and 40 are greater than the inlet pressure at port 4. This again will drive spool 48 to the right as previously described. With this condition, the higher pressure in chamber 22 will be exerted through orifice 44, conduit 46, and through manifold 64 to line 66, and therefore into chamber 70 of spool 28, tending to drive spool 28 to the right. This will diminish the area of orifice 24 and increase the area of orifice 36, thus tending to equalize the pressure in both chambers 22 and 34. By activating coils 96 and 97 so as to move plate 94 downwardly on the right side and upwardly on the left side, pressure in manifold 104 will be greater than in manifold 84, thus driving spool 106 to the right. This will vent pressure from cavity 70 due to flow in conduit 116 through manifolds 174 and 154 into line 150 and low-pressure cavity 8. This venting of pressure will tend to move spool 28 to the desired position. At the same time, pressure in cavity 22 will be vented into manifold 176 and manifold 166 in spool 108 through orifice 168 into line 126 and thus into manifold 65 through orifice 63 and thence into manifold 50 and line 52 into cavity 56 of spool 28. By proper positioning of spool 108 in all of the previous examples, flow from either outlet 32 or 40 can be completely cut off.

Thus it can be seen that by this invention a flow-equalizing valve has been provided which has several advantages. With higher upstream pressure, equal flows can be provided through two outlets regardless of downstream pressure. In addition, by the use of a servo-proportioning valve, any desired flow can be provided through downstream ports in any proportion desired regardless of back pressure. In addition, the valve is reversible, and combining flows from higher downstream pressures than upstream pressures can be accomplished by either providing equal flows or proportioning these flows as desired independent of downstream pressure.

Having described this invention, it is to be understood that the invention is to be limited only by the scope of the claims appended hereto.

I claim:
1. A flow-equalizing valve comprising:
   a valve housing having an inlet passage,
   a flow divider having first and second equal area orifices, each of said orifices leading into a first and second line respectively;
   a movable rst spool forming with said housing a first and a second outlet orifice for said first and second lines, respectively,
   a movable first spool forming with said housing a first said second spool to said first spool and to opposite sides of said flow divider,
   said first spool having fluid connections with said first and second lines through said second spool such that when said second spool is in a first position, area of said second outlet orifice is increased and area of said first outlet orifice is restricted when pressure in said second line is greater than said pressure in said first line, and area of said second outlet orifice is restricted and area of said first outlet orifice is increased when pressure in said first line is greater than pressure in said second line, such that pressures in said first and second lines are balanced to provide equal flow through said first and second equal area orifices in said flow divider;
   said second spool further being movable to a position to reverse the control of said first spool when pressure in said first and second lines is greater than said pressure in said inlet passage.

2. A flow-equalizing valve according to claim 1 and further including flow-proportioning means adapted to selectively vary the position of said first spool whereby to vary the flow through said equal area orifices relative to each other.

3. A flow-equalizing valve according to claim 1 wherein said first and second equal-area orifices are normally closed by a piston, said piston being resiliently biased to open said equal area orifices in response to pressure in said inlet by a predetermined amount greater than pressure in said first and second lines.

4. A flow-equalizing valve according to claim 3 and further including a cylinder surrounding said piston, said cylinder being resiliently biased to open said first and second equal area orifices when the pressure in said first and second lines is greater by a predetermined amount than pressure in said inlet.

5. A flow-equalizing valve comprising:
   a valve housing,
   an inlet passage leading into said valve housing,
   a flow divider connected with said inlet passage, said flow divider comprising a first and a second orifice, each orifice being of equal area;
   first and second lines connected with said first and second orifices, respectively;
   a first spool having first and second operating areas, said spool forming with said housing first and second outlet orifices for said first and second lines respectively, said spool being movable in response to the forces exerted on said operating areas to move to a position to constrict the opening of either one of said outlet orifices while widening the opening of the other orifice;
   a third line connecting said first line and said first operating area of said spool and a fourth line connecting said second line and said second operating area of said spool such that when said second line has greater pressure than said first line, said spool is moved to a position to open said outlet orifice for said first line;
   a second spool located in said third and fourth lines and acted upon by the pressure drop across said equal area orifices such that it is movable to a first position to connect said first line and said first operating area of said first spool and said second line and said second operating area of said first spool when the pressure in said inlet passage is greater than the pressure in said outlet orifices, said second spool being adapted to move to a second position to connect said first line and said second operating area of said first spool and to connect said second line to said first operating area of said first spool when pressure in said first and second lines is greater than said pressure in said inlet passage,
   whereby the pressures in said first and second lines are equal and the flow through said first and second orifices are equal.

6. A flow equalizing valve as set forth in claim 5 wherein flow proportioning means are provided including
   a spool-type control valve having a plurality of lands,
   a plurality of control conduits communicating fluid pressure in said inlet passage in said first and second lines, and with said first and second operating areas of said first spool with said control valve;
   an electrically operated servo valve controlling the position of said control valve to vary the pressure differential between said first and second operating areas of said first spool to control flow from said outlet orifices in the desired proportion.

References Cited
UNITED STATES PATENTS

| | | | |
|---|---|---|---|
| 2,413,896 | 1/1947 | Trautman et al. | 137—101 |
| 2,460,774 | 2/1949 | Trautman | 137—101 |
| 2,466,485 | 4/1949 | Schultz | 137—101 |
| 2,823,689 | 2/1958 | Healy | 137—82 |
| 3,033,232 | 5/1962 | Bahniuk | 137—625.62 |
| 3,347,254 | 10/1967 | Compton et al. | 137—101 |

ALAN COHAN, *Primary Examiner.*

DAVID J. ZOBKIW, *Assistant Examiner.*

U.S. Cl. X.R.

137—82, 111, 118, 625.61, 625.63, 625.64